Patented Nov. 21, 1950

2,530,459

UNITED STATES PATENT OFFICE 2,530,459

CARBON SUPPLYING COMPOSITION

Stanley A. Gilbert, Red Bank, N. J., and Alfred H. Stanley, Lykens, Pa., assignors, by mesne assignments, to The Hanna Furnace Corporation, Detroit, Mich., a corporation of New York No Drawing. Application August 26, 1947, Serial No. 770,762

5 Claims. (Cl. 75—48)

The present invention relates to a novel carbon-supplying composition adapted for use in the making of cast iron, and more specifically it relates to a solid carbonaceous conglomerate composition capable of supplying carbon to iron in the cupola in the manufacture of cast iron.

In the making of cast iron, it is general practice to melt pig iron and scrap iron and/or scrap steel in a cupola which is similar to a small blast furnace. The fuel employed is generally coke, and a small amount of flux, usually limestone, is provided to form a slag with the ash from the coke and any sand adhering to the pig iron. Molten cast iron will absorb at best about 4% carbon, and it is in many cases advantageous to provide a carbon content in the cast iron in the neighborhood of 3.5% or more. The relatively large amount of carbon in the pig iron, about 4%, is, therefore, relied upon to balance the lower carbon content of the scrap to provide a suitable carbon content in the cast iron. The quality of coke used as fuel cannot be depended upon to supply additional carbon to the iron. In many installations, the carbon picked up by the metal from the coke does not replace the carbon lost from the metal through oxidation with the result that the cast iron has less carbon than is contained in the initial metal charge. The iron, however, generally passes through the cupola unchanged in composition; the overall carbon content of the metal charge remaining about the same, minor decreases as stated sometimes occurring due to oxidation.

Due, however, to the present and prospects of future scarcity of pig iron, there is an urgent need for materials that are suitable for addition to the cupola, and which will function to supply carbon to the iron to provide maximum carbon content in the iron and to permit greater proportions of scrap iron to be used in the charge, in place of pig iron.

Pitch cokes and petroleum cokes, whose structure is sufficiently strong to withstand the weight of the cupola contents and the force of the air blast, have been used for this purpose with varying degrees of success. The softer pitch cokes and petroleum cokes, however, break down and disintegrate due to the extreme conditions in the cupola and are quickly removed from the charge by the force of the air blast. For these reasons, the softer pitch cokes and petroleum cokes have in most cases failed completely to supply carbon to the iron. Graphite briquets and scrap carbon electrodes have also been used for the purpose of supplying carbon to cast iron, but they are for the most part quite expensive and have either been entirely unsuccessful or of such little success as to not warrant their use. The use of compositions, such as briquets, of combined carbon, has also been attempted. However, these compositions are also very expensive and since only a portion of the combined carbon is absorbed by the molten metal, their use is not economically feasible.

The product of the present invention on the other hand, not only withstands to a high degree the conditions in the cupola and thus does not disintegrate and become lost to the charge at a deleterious rate, but furnishes to a marked degree carbon to the iron. Thus, by the use of the product of the present invention, the proportion of pig iron may be greatly reduced in the cupola charge, allowing correspondingly larger amounts of scrap iron and scrap steel to be used. Also, even when the usual proportions of pig iron to scrap are employed, the composition provides additional carbon for the iron. Moreover, it has been found that when the carbon-supplying composition of the present invention is substituted for part of, or added to the fuel charge, higher temperatures result in the cupola. This is due to the higher B. t. u. value of the product. Furthermore, since the product may be made in any desirable size or shape, it is very easy to handle and may even be used as a precise adjustive means to compensate for fluctuations in atmospheric conditions which often affect the oxidizing conditions in the cupola and thus the degree of carbon "pick-up" in the metal. In addition, in the product of the present invention, use may be made of the more readily available, but heretofore unusable softer, weak structured pitch cokes and petroleum cokes.

Many more advantageous properties of the product of the present invention will be evident hereinafter.

An object of the present invention is to provide a composition suitable for addition to the cupola in the manufacture of cast iron to supply carbon to the metal.

Another object is to provide a solid carbonaceous conglomerate composition in any desired size and shape whose structure will withstand the extreme conditions in the cast iron cupola without disintegration while supplying carbon to the molten cast iron.

A further object is to provide a carbon-supplying composition which will permit the use of larger proportions of scrap iron and scrap steel as compared to pig iron, while at the same time providing for the desired carbon content of the iron.

A further object is to provide a carbon-supplying composition in easily handled form, such as in the form of briquets and which may be fed to the cupola in relatively small increments in the making of cast iron to adjust for fluctuations in the oxidizing conditions and thus the carbon "pick-up" of the iron caused by changes in atmospheric conditions.

Still another object is to provide a composition that may be substituted for part of or added to the fuel charge in a cast iron cupola and while supplying carbon to the cast iron also provides higher temperatures than those obtained by the use of the ordinary fuel alone.

Further objects will be apparent from a consideration of the following specification and claims.

The product of the present invention comprises a solid carbonaceous composition in the form of a hard, rigid, and coherent conglomerate of any desired shape or size. The product comprises residual carbon coke particles selected from the group consisting of pitch coke particles and petroleum coke particles, and particles of a hydrocarbon black obtained by the incomplete combustion of hydrocarbons, bound in the conglomerate by a solidified binder. Advantageously, in order to facilitate handling, shipping, and storage, the conglomerate will be uniform in shape and generally of a size that can be readily handled and fed in relatively small increments to the cast iron cupola, such as, for example, weights ranging from an ounce to five pounds. However, the conglomerate may be prepared in larger sizes and crushed or otherwise reduced in size prior to use if necessary.

As stated, the product of the present invention is capable of withstanding to a great degree the extreme conditions of the cupola and supplies to the iron any amount of carbon desired even approaching the saturation point. This feature was wholly unexpected since, as hereinabove stated, the ordinary coal coke used for fuel supplies little, or as in most cases, no carbon to the metal, while residual carbon cokes, such as pitch coke and petroleum coke, by themselves, either failed completely to supply carbon to the iron or failed to supply the high amounts often desired. Moreover, the extremely fine hydrocarbon black obtained by the incomplete combustion of hydrocarbons, by itself is useless for the purpose of supplying carbon to cast iron in the cupola. Thus, while it is believed that the presence of the fine hydrocarbon black particles in the product of the present invention, along with the residual carbon coke particles and solidified binder, affords a more dense conglomerate and thus a stronger and tougher composition, the reason for the outstanding carbon-supplying properties of the product is not fully understood.

Referring to the residual carbon coke that is one component of the conglomerate, it is the solid carbonaceous residue resulting from the distillation of hydrocarbon material. Usually such residual carbon cokes are prepared during the distillation of coal tar or the refining of petroleum and form the solid amorphous carbonaceous residue remaining after this treatment. The residual carbon coke obtained in the first case is usually referred to as pitch coke, while that obtained in the second case is usually referred to as petroleum coke. The coke-like residue remaining after the distillation of hydrocarbons being known as residual remaining after the distillation of hydrocarbons being known as residual carbon, the coke employed in the process of the present invention and present in the product thereof will be referred to hereinafter and in the claims as residual carbon coke, as distinguished from the coke produced by the destructive distillation of coal. The residual carbon coke such as pitch coke and petroleum coke are available in grades differing as to structural strength. That is to say, some grades of residual carbon cokes possess sufficient structural strength to withstand to a certain degree the extreme conditions in the cupola, while other grades possess insufficient structural strength and are quickly disintegrated and are removed from the charge by the air blast. Although the prime value of the present invention resides in the utilization of the structurally weak residual carbon cokes to provide a composition of outstanding carbon-supplying properties, the use of the structurally strong residual carbon cokes also results in compositions possessing unexpectedly improved carbon-supplying properties. The various residual carbon cokes also vary somewhat as to their carbon content. Generally speaking, the higher the carbon content of the residual carbon coke employed the better the carbon-supplying results per unit weight of the material. However, residual carbon coke having a carbon content of as low as about 75% may be employed in preparing the product, while preferably the carbon content of the residual carbon coke employed will be above about 85%. Since the pitch cokes generally possess carbon contents of about 90% and higher, while the carbon content of the petroleum cokes ranges between about 80% and 90%, the pitch cokes are the preferred residual carbon cokes.

As stated, in the product of the present invention, the residual carbon coke is present in particle form—that is the conglomerate is formed of particles of residual carbon coke and of a hydrocarbon black bound in a matrix of solidified binder. The size of the residual carbon coke particles may vary widely, depending mainly upon the final size of the product. For most purposes, that is, when the product is to be prepared in sizes ranging from an ounce to five pounds, the particle size of the pitch coke may range 1 inch and finer. That is to say, the particles will pass through a 1 mesh screen. Preferably, however, at least 90% of the residual carbon coke particles will pass through a 10 mesh screen.

The hydrocarbon black used in preparing the product is an extremely finely divided form of carbon formed by the incomplete combustion of hydrocarbon materials. The hydrocarbon blacks most readily available are those obtained from the soot or smoke during the incomplete combustion of solid, liquid, or gaseous hydrocarbons. They are generally obtained by either the direct impingement of a flame on moving metallic surfaces or by depositing and collecting smoke or soot particles from an unobstructed hydrocarbon flame. Examples of such blacks are carbon black or gas black produced by the incomplete combustion of natural or artificial gas; acetylene black produced by the incomplete combustion of acetylene gas; lamp black produced by the incomplete combustion of liquid hydrocarbons such as oils, for instance tar oils and petroleum oils, fats, and resins and the like. For the purposes of the present invention, any of the so-called hydrocarbon "blacks," "pigments," or "soots" obtained by the incomplete combustion of hydrocarbons, and referred to herein as hydrocarbon blacks, may be employed. These hydrocarbon blacks are generally of extremely fine particle size and usually range from about 3 microns down to 0.025 micron and even lower. Sometimes, however, to facilitate handling, the blacks are available in pelletized form, water usually having been sprayed on the hydrocarbon blacks to gather the particles into fine lumps. Since, however, the hydrocarbon blacks, even in pelletized form, exist as fine particles, and since the pellets are for the most part broken down in the preparation of the composition, it will be understood that the use of the pelletized hydrocarbon blacks is contemplated in the preparation of the product of the present invention.

As stated, in the product of the invention, the residual carbon coke particles and hydrocarbon black particles are bound into a conglomerate form by a solidified binder. The binder employed in preparing the product may be any material which is liquid at practical temperatures and which will thus wet the particles during mixing, but which will be subsequently rendered solid or become solidified either by cooling to normal temperatures alone, or by first subjecting to a heat treatment. In other words, the binder may be initially a material liquid at room temperature or upon heating to practical elevated temperatures such as those not appreciably above about 400° F., so that it may be mixed with and will wet the residual carbon coke particles and hydrocarbon black particles and which will then solidify either by being cooled to normal room or atmospheric temperature or by being heated to drive off volatiles such as water and/or light hydrocarbons or to set or polymerize the material followed by cooling to normal room or atmospheric temperatures if necessary. There are many materials that may serve as binders in the product. However, it is preferred that the binder be for the most part at least an organic material which will produce a minimum amount of ash upon burning. Such organic binders are, for example, the tars and pitches produced by the distillation of coal or petroleum such as coal-tar pitch and petroleum tar pitch, molasses, natural and artificial asphalts, natural and synthetic resins, lignin-containing waste paper liquors, linseed oil, starch, mixtures of starch and asphalt, and the like. Of these, coal-tar pitch is preferred. Inorganic materials that have ordinarily served as binders such as water glass, silica gel, clays, and the like may also be employed as binders in the present invention. However, due to the fact that inorganic binders contain relatively large amounts of ash, they are less desirable than organic binders.

In the product of the present invention, the residual carbon coke particles and hydrocarbon black particles are bound in the form of a hard, coherent conglomerate by the solidified binder. The relative proportions of the three components may vary over a wide range to produce such a composition. Generally, however, from the standpoint of physical characteristics as well as carbon-supplying properties, the residual carbon coke particles will be the main component in the product, that is to say, of the binder, hydrocarbon black particles, and residual carbon coke particles, the residual carbon coke particles will predominate. Usually, the hydrocarbon black content of the product will range between about 1% and about 40%, preferably between about 5% and 20% based on the combined weight of the hydrocarbon black, residual carbon coke, and binder. The binder will be sufficient to secure the residual carbon coke particles and hydrocarbon black particles in a rigid, coherent conglomerate, and is usually present in an amount between about 3% and 35%, preferably between about 6% and 18%, based on the combined weight of the three principal components.

In preparing the product of the present invention, the binder in a liquid state, the residual carbon coke particles, and hydrocarbon black particles are mixed together. Generally, the residual carbon coke particles and liquid binder are first mixed to form a uniform mixture, after which the hydrocarbon black is added to and mixed therewith. Advantageously, the hydrocarbon black particles, residual carbon coke particles, and binder are mixed sufficiently to obtain maximum wetting of the particles by the binder. As stated, the binder may be initially liquid at room temperature or may be solid at room temperature, in which event it will be necessary to melt it prior to its incorporation with the residual carbon coke and hydrocarbon black particles. When the residual carbon coke particles, hydrocarbon black particles, and binder in the liquid state have been mixed, a workable or moldable plastic mixture results which can readily be molded or otherwise shaped into the desired final form and size. Generally, if the binder is of the type that solidifies upon cooling to room or other normal atmospheric temperatures after the mixture has been shaped or formed into the desired size and shape, the mixture may be merely cooled to produce the product of the invention. However, if the binder is of the type that necessitates a heating or drying treatment either to drive off volatile material or to set or be polymerized or both, the shaped product may be subjected to such a treatment in ordinary heating ovens or drying chambers. The shaped mixture may in this case be heated up to as high as 600° F. or higher, for example, up to 1200° F., in which case volatiles may be quickly driven off. Intermediate temperatures may be employed, in which case the time required will vary accordingly. The time required for the heating and/or drying step will be sufficient to provide a composition which will be rigidly solid at room or other normal atmospheric temperatures. As stated, in the preferred embodiment of the invention, the binder is an organic binder, and in the event such a binder requires heat treatment, it is in most cases desirable to employ temperatures not appreciably above 600° F. If it is desired to at least partially carbonize the binder, however, temperatures higher, for example, in the neighborhood of 800° F. to 1200° F. may be used.

Advantageously, the above described moldable plastic mixture of residual carbon coke particles, hydrocarbon black particles, and liquid binder is formed or molded into the desired size and shape under pressure. For this reason, conventional briquet presses may be conveniently employed in forming the plastic mixture into the size and shape desired. The plastic mixture in such a procedure is fed to the press where it is subjected to a pressure of from about 1000 p. s. i. up to as high as 100,000 p. s. i., usually between about 4500 and 30,000 p. s. i. However, it is understood that, depending upon the type of equipment and binder employed, positive pressures less than 1000 p. s. i. may be used. The temperature of the press rolls or platens may or may not be elevated. In some cases, it may be desirable to hold the rolls or platens at an elevated temperature in order to maintain the binder fluid during the molding. If the press rolls or platens are not equipped for heating, it may be desirable to preheat one or more of the components or the mixture which will in turn supply heat to the press.

The shaped or molded product, after having been subjected to a heating and/or drying treatment if necessary, is ready for use. Obviously, products of extra large size may be prepared that might necessitate crushing or other size reduction to provide the conglomerate in readily handled sizes. In any event, the conglomerate product of the present invention is highly suited for addition to the cupola in the manufacture of cast iron, either as part of the fuel charge or extraneously during any part of the process. As stated, the employment of the product of the present invention permits much larger proportions of the low carbon-containing scrap iron and scrap steel to be charged as compared to pig iron. Moreover, the use of the composition of the present invention has certain advantages over the use of pig iron alone as the carbon-supplying agent in the preparation of cast iron. For example, the increase in carbon given by the use of pig iron is a constant, whereas the lower the carbon input in the metal charge, the greater the carbon pick up through the use of the product of the present invention. By way of illustration of this, with a carbon input of 3.44% in a metal charge, the use of 10% of the product of the present invention, based on the weight of the fuel charge, added with the fuel charge raises the carbon content in the cast metal to 3.54%. If the carbon input of the metal charge were 2.90%, the same amount of the product raises the carbon to about 3.10% or higher. On the other hand, the amount of pig iron required to obtain the 0.10% increase in carbon in the first case would raise the carbon content in the second case only 0.10%.

The following table illustrates the marked extent of carbon pick-up by the cast iron when using the composition of the present invention as compared to a procedure in which the composition was not employed. The composition was used in charges 2, 3, and 4 in the form of briquets and comprises 82% pitch coke, 10% carbon black, and 8% coal tar binder:

*Table*

| Charge | 1 | 2 | 3 | 4 |
| --- | --- | --- | --- | --- |
| lbs. pig iron (4.00% C) | 500 | 500 | 250 | 300 |
| lbs. scrap (3.30% C) | 750 | 750 | 750 | 300 |
| lbs. scrap (3.20% C) | 750 | 750 | 1,000 | 1,200 |
| lbs. scrap steel (0.30% C) | | | | 200 |
| lbs. fuel | 300 | 300 | 300 | 300 |
| lbs. briquets | | 21 | 45 | 45 |
| lbs. metal charge | 2,000 | 2,000 | 2,000 | 2,000 |
| lbs. carbon in metal charge | 68.75 | 68.75 | 66.75 | 60.90 |
| per cent carbon in metal charge | 3.44 | 3.44 | 3.34 | 3.05 |
| per cent carbon in cast iron | 3.38 | 3.49 | 3.51 | 3.35 |
| per cent loss of carbon by oxidation | .06 | .06 | .06 | |
| per cent carbon pick-up | | .11 | .23 | .30 |

The following examples are intended as illustrations of the product of the present invention and of the process for preparing the same, and are not intended to limit in any way the scope of the invention:

*Example I*

82 parts of pitch coke having the following screen analysis: 1.5% retained on a 10 mesh screen, 13.5% retained on a 20 mesh screen, 26.0% retained on a 40 mesh screen, 21.0% retained on a 60 mesh screen, 11.0% retained on an 80 mesh screen, 5.5% retained on a 100 mesh screen, and 12.5% finer than 100 mesh were preheated to 500° F. and mixed with 8 parts of molten coal tar pitch heated to 325° F. When a uniform mixture was obtained, 10 parts of carbon black were added and the mass thoroughly mixed. The resulting plastic mixture was fed to a simple roll type briqueting press and there molded into pillow shaped blocks weighing about 2 ounces each. The pressure exerted by the press was about 6500 p. s. i. The blocks or briquets were then conveyed to drying ovens and exposed to a temperature of 450° F. for 45 minutes. The product had a crushing strength on the Standard Tinius Olsen Crushing Machine of 824 p. s. i., and analyzed 86.57% fixed carbon, 10.75% volatile, 2.08% ash, .40% sulphur, and .60% moisture.

*Example II*

12,214 pounds of pitch coke having the same screen analysis as in Example I were preheated to 500° F. and mixed with an emulsified mixture of 660 pounds of molten asphalt, 160 pounds of starch, and 2160 pounds of water. Upon thorough mixing, 960 pounds of lamp black were added and the mass again thoroughly mixed. The resulting mixture was fed to a simple roll type briquetting press and molded under a pressure of about 6500 p. s. i. into blocks weighing about 2 ounces each. The molded blocks were then conveyed to drying ovens where they were subjected to a temperature of 450° F. for 1 hour. Upon cooling, the blocks were ready for use.

*Example III*

70 parts of pitch coke having the following screen analysis: 14% retained on a 10 mesh screen, 25.9% retained on a 20 mesh screen, 26.3% retained on a 40 mesh screen, 13.3% retained on a 60 mesh screen, 5.2% retained on an 80 mesh screen, 2.4% retained on a 100 mesh screen, and 12.9% finer than 100 mesh were thoroughly mixed with 10 parts of molten coal tar pitch heated to 350° F. 20 parts of carbon black were then added and the resulting mass thoroughly mixed. The mixture was then molded in a briquetting press as in Examples I and II. The molded compositions were then subjected to 500° F. for 1 hour in drying ovens. The resulting product had a crushing strength of 804 p. s. i.

Considerable modification is possible in the selection of the principal components and in the method of preparing the novel composition without departing from the scope of the present invention.

We claim:

1. A solid carbon-supplying composition suitable for addition to the cupola in the manufacture of cast iron consisting essentially of residual carbon coke particles, hydrocarbon black particles, and a solidified binder therefor, said hydrocarbon black particles being present in an amount between about 5% and about 20%, and said binder being present in an amount between about 6% and about 18%, based on the combined weight of said three ingredients, and said composition being free of material substantially inhibiting absorption of carbon from the composition by molten iron in the cupola.

2. The product of claim 1 wherein the binder is an organic binder.

3. The product of claim 2 wherein the residual carbon coke is pitch coke.

4. The product of claim 2 wherein the hydrocarbon black is carbon black.

5. The product of claim 3 wherein the hydrocarbon black is carbon black.

STANLEY A. GILBERT.
ALFRED H. STANLEY.

REFERENCES CITED

The following references are of record in the file of this patent:

UNITED STATES PATENTS

| Number | Name | Date |
|---|---|---|
| 1,037,901 | Hansen | Sept. 10, 1912 |
| 1,165,003 | Gilligan | Dec. 21, 1915 |
| 1,307,738 | Hinckley | June 24, 1919 |
| 1,655,728 | Johnston | Jan. 10, 1928 |
| 1,666,312 | Runyan | Apr. 17, 1928 |
| 1,968,846 | Morrell | Aug. 7, 1934 |
| 2,068,793 | Frauenknecht | Jan. 26, 1937 |
| 2,095,760 | Moberly | Oct. 12, 1937 |
| 2,148,133 | Reuscher | Feb. 21, 1939 |
| 2,177,226 | Rice | Oct. 24, 1939 |
| 2,224,724 | Elsey | Dec. 10, 1940 |

OTHER REFERENCES

"Industrial Carbon" by Mantell (2nd edition, published 1946), pages 195 and 200.

Certificate of Correction

Patent No. 2,530,459                                       November 21, 1950

STANLEY A. GILBERT ET AL.

It is hereby certified that error appears in the printed specification of the above numbered patent requiring correction as follows:

Column 3, line 75, beginning with the word "remaining" strike out all to and including "residual" in column 4, line 1;

and that the said Letters Patent should be read as corrected above, so that the same may conform to the record of the case in the Patent Office.

Signed and sealed this 10th day of July, A. D. 1951.

[SEAL]

ERNEST F. KLINGE,
*Assistant Commissioner of Patents.*